Patented Jan. 17, 1950

2,494,745

UNITED STATES PATENT OFFICE 2,494,745

PREPARATION OF A PENICILLIN-LIKE COMPOUND

Elmer W. Cook, New York, and Samuel Kushner, Nanuet, N. Y., assignors to American Cyanamid Company, New York, N. Y., a corporation of Maine No Drawing. Application March 22, 1947, Serial No. 736,582

1 Claim. (Cl. 260—302)

This invention relates to certain new pharmaceutical substances and methods for preparing pharmaceutical substances both new and old. Certain of the compounds produced by the method of this invention possess remarkable utility as anti-biotic substances similar to penicillin; and when suitable starting materials are chosen substances are produced which are believed to be identical with certain of the penicillins. In the fermentation process for producing penicillin there is but slight flexibility and improvements are largely restricted to improving the yield and reducing the price, with limited changes in the nature of the end product. By the methods of this invention it is possible to synthesize anti-biotics of new and characteristic structure so that improvements are made in the products themselves.

More particularly, this invention relates to the reaction of substituted methylene phenaceturic azlactones and related compounds with beta-mercapto-valine and related compounds. The preparation of the substituted methylene phenaceturic azlactone is described in a patent application of Elmer W. Cook, Edwin Oscar Hook and Samuel Kushner, Serial No. 728,202, filed February 12, 1947, "The azlactones of phenacetamino acrylic acids and their preparation." Whereas in that application the nomenclature of the compound was as a substituted acrylic acid, in the present instance the present compounds are described as phenaceturic azlactones because this nomenclature is more convenient in describing the reaction products obtained.

The preparation of the beta-mercapto-valine may be made in accordance with that described in the application of Beegle and Hook, "Mercapto-valine compounds and the preparation of same." Serial No. 545,382, filed July 17, 1944. It may be used as either the free acid, or salt, or as an ester. For convenience, the hydrochloride is usually used.

More particularly this invention relates to the reaction of the compounds of the formula

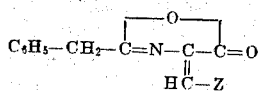

where Z is —Br, —Cl, —OCH$_3$, —OC$_2$H$_5$, —OCOCH$_3$, —SC$_2$H$_5$ or SCH$_2$C$_6$H$_5$, or compounds of a similar formula in which the phenyl group of the phenaceturic azlactone may be substituted by halogen, alkyl, or alkoxy groups or otherwise, with compounds of the nature of beta-mercapto-valine or related substitution products thereof. Whereas for the production of compounds which appear to be practically identical with penicillin G, a substituted methylene phenaceturic azlactone and beta-mercapto-valine are used, related products are produced by the use of related starting materials and actually have a far higher potential utility than penicillin G itself because it is not possible to obtain all such new and useful compounds by the conventional fermentation process such as is used for the production of penicillin today.

The reactions involved may, in the case of beta-mercapto-valine and methoxy methylene phenaceturic acid azlactone, be summarized as:

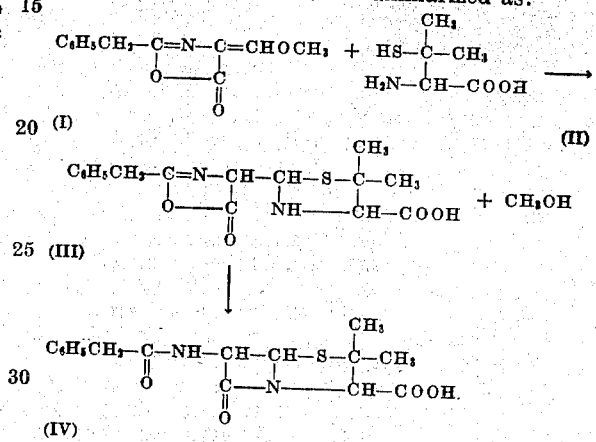

The initial material (I) is variously named as beta methoxy alpha phenylacetamino acrylic acid azlactone; methoxymethylene phenaceturic azlactone; and 2-benzyl-4-methoxymethylene-5-(4) oxazolone. For maximum therapeutic effect, the (d) beta-mercapto-valine (II) is preferred, but for convenience, the d,l or unresolved form is used. The mechanism of reaction is not certain, and because of the low yields appears to be the result of competing mechanisms. The thiazolidine azlactone Formula III appears to result from the addition to the double bond followed by the elimination of methanol, a combination condensation-polymerization type. The internal rearrangement from III to IV is postulated, but not certain, as characteristics of each appear. It might appear that tautomers exist. The best authorities seem to prefer Formula IV.

Because of the elimination of the small molecule in the condensation, the substituent on the methylene group (as shown by Z) is not critical, providing, always, that the condensation will occur.

The methyl groups from the alpha-amino-beta-mercapto acid may be substituted by other groups if desired, particularly ethyl or hydrogen. Similarly, instead of the benzyl group, as in phenaceturic acid azlactone itself, any of the groups occurring in the known penicillins as well as others may be used. For example, benzyl is used as a radical on the oxazolone ring for the G penicillin and n-heptyl, delta$^2$ pentenyl, and para-hydroxybenzyl for the corresponding penicillins K, S and X, respectively.

Because of the peculiarities of the chemistry involved and because of the ease of decomposition and internal rearrangements, it is not possible with absolute certainty to assume that the compounds do have the formulas which would be logically ascribed from their methods of preparation by the disclosures in this specification. The examples are as clear as present knowledge of the chemical arts permits in a substance of this nature.

EXAMPLE I

*Preparation of methoxy methylene phenaceturic azlactone*

Beta-methoxy, d,l-alanine was prepared by the conventional method of treating acrylic ester with mercuric acetate to obtain the beta-methoxy alpha-mercuric acetate double salt which in turn was treated with potassium bromide and then bromine giving alpha-bromo beta-methoxy propionic ester which was hydrolyzed in turn with sodium hydroxide to get the free acid and the free acid converted to the alpha-amino by the use of ammonia.

Twenty-four grams of the beta-methoxy d,l-alanine thus formed was dissolved in 150 cc. of water containing 8 g. of sodium hydroxide. The solution was stirred and cooled in an ice bath while from separate funnels, simultaneously, was gradually added 38 grams of phenylacetyl chloride and a solution of 8 g. of sodium hydroxide in 50 cc. of water, the pH being maintained slightly on the alkaline side at all times. After stirring for 45 minutes at room temperature the solution was decolorized with absorbent charcoal and then filtered. The solution was acidified until acid to Congo red with hydrochloric acid, whereupon the product came out as an oil which crystallized upon standing and chilling. The product was dried in a vacuum desiccator over phosphorus pentoxide giving an almost white crystalline product which melted at 170–172° C.

Ten grams of the phenylchloroacetyl beta methoxy d,l-alanine as thus prepared was added to a mixture of 100 cc. of acetic anhydride and 30 cc. pyridine previously cooled in an ice bath. By occasional shaking, the solid soon dissolved, and was allowed to stand in the refrigerator for 48 hours. The reaction mixture was added to 1000 g. cracked ice and stirred for 30 minutes. By this time, most of the azlactone had precipitated, and the whole mixture was extracted three times with trichlorethylene. The extract was washed successively with iced dilute hydrochloric acid and iced dilute sodium bicarbonate. After drying over sodium sulfate and plaster of Paris, the extract was evaporated under reduced pressure at bath temperature not over 50° C. The gummy residue was dissolved in twice its volume of benzene and, on standing in the cold, beta-methoxy phenylacetamino acrylic acid azlactone crystallized. After separating this fraction, a second crop was obtained on concentrating by placing in a vacuum desiccator. A total crude yield was obtained of 8 g. By recrystallizing from benzene, 4.5 g. of product, melting at 87–89° C., was obtained, representing 56% of the theoretical yield.

EXAMPLE II

*Beta-mercapto-valine*

A mixture of 192 grams of ethyl alpha-nitro-dimethylacrylate and 1 to 2 grams of piperidine was prepared, and 138 grams of benzyl mercaptan was slowly added with stirring. The reaction which took place was exothermic, and the rate of addition of the benzyl mercaptan was adjusted so as to maintain the temperature of the reaction mixture at about 50° C. The product was then allowed to stand overnight at room temperature.

The crude product, ethyl alpha-nitro-beta-benzylmercapto isovalerate, was then reduced with tin and dry HCl in methanol, at 50° C. The tin double salt crystallized out and was filtered off. The filtrate was evaporated under a vacuum at 60/70° C. to less than about half its original volume. Water was then added and another crop of the crystalline tin salt collected. The total quantity of tin salt, 520 grams, was dissolved in 90% methanol, and sodium bicarbonate was added to a pH of 6 to 7. The solution was then treated with hydrogen sulfide to precipitate tin. The tin sulfide was filtered off, the pH again adjusted to between 6 and 7 and the solution again treated with hydrogen sulfide. This procedure was repeated until all of the tin had been removed.

The filtrate was then evaporated to dryness under a vacuum, the residue dissolved in 300 cc. of methanol, and the resulting solution warmed and filtered to remove sodium chloride. After evaporation of the filtrate to dryness, 200 grams of viscous syrup was obtained which represented a yield of 63.6% of beta-benzyl mercaptovaline ethyl ester hydrochloride based on the ethyl alpha-nitrodimethylacrylate.

Approximately 45 grams of the beta-benzyl-mercaptovaline ester hydrochloride prepared as just described was refluxed for three hours with 200 cc. of 6 N hydrochloric acid. The solution was then treated with activated charcoal and then filtered. The free beta-benzyl mercaptovaline was precipitated by treating the solution with sodium hydroxide to a pH of 6. The mixture was cooled, filtered and the precipitate washed with a little cold water, alcohol, and ether. A yield of 39 grams (71%) of beta-benzyl mercaptovaline melting at 208–209° C. was obtained.

A solution of 20 grams of beta-benzyl mercaptovaline in 300 cc. of liquid ammonia was placed in a flask fitted with a stirrer. An amount, 4.3 grams, of metallic sodium was added in small proportions until a blue color persisting at least for 20 minutes was produced. An equivalent amount of ammonium chloride was then added in small proportions. Excess ammonia was then evaporated off by first warming the reaction mixture on a water bath, then placing it under a vacuum for several hours. The residue was slurried up in 150 cc. of methanol. Dry HCl was passed in until the reaction mixture was acid to Congo red and the mixture stirred until all of the pink particles had dissolved or turned white. The reaction mixture was then filtered to remove sodium and ammonium chlorides. Upon evaporation of the filtrate under vacuum, 17 grams of crude beta-mercapto-valine hydrochloride was obtained. This product was further purified by redissolving in a minimum amount of methanol and then filtered and evaporated to dryness under vacuum. Fifteen grams of beta-mercapto-valine hydrochloride, a white solid product, melting with decomposition at 170–175° C., was obtained.

EXAMPLE III

Pharmaceutical compound

In 1000 parts by volume of cold glacial acetic acid was dissolved 73 parts of methoxy methylene phenaceturic azlactone prepared as in Example I, 50 parts beta-mercapto-valine prepared as in Example II, and 30 parts sodium acetate. The mixture was stirred and shaken for approximately 20 minutes to obtain complete solution and reaction. The solution was evaporated under vacuum and the residue washed with anhydrous ether. The product so obtained, a yellow deliquescent powder, without further purification possessed a 2.5 Oxford units activity per mg. as penicillin upon bio-assay.

It was also examined in the infra-red and some of the characteristic spectrum of penicillin observed. An infra-red spectrum of the product as compared with a sample of penicillin G prepared by the fermentation process showed the effective compounds to appear to be identical. The absorption band near 3300 reciprocal centimeters caused by the N-H stretching vibration appeared in both samples. An absorption near 1770, correlated with the anti-biotic activity of penicillin appeared in both samples although weaker in the prepared product, as it showed only 2.5 Oxford units activity. An absorption band appeared near 1650 and was associated with the amide carboxyl stretching vibration and absorption near 1510 appeared from the amide radical whereas a band near 1600 results from the compound being a metallic salt of a carboxyl radical. The remaining spectral regions were occupied by bands that are more difficult to assign to definite structure, but are similar in both the natural product and the synthesized product.

The product as obtained may be further purified by the standard methods used in the purification of penicillin to obtain such higher activity as may be desired.

EXAMPLE IV

Reaction of bromomethylene phenaceturic azlactone with beta-mercapto-valine

Thirteen and three-tenths parts of bromomethylene phenaceturic azlactone, prepared as described in application Serial No. 728,202, 8.5 parts beta-mercapto-valine, and 10.25 parts sodium acetate were dissolved in 30 parts glacial acetic acid. The mixture was allowed to stand under a nitrogen atmosphere for 32 hours at room temperature. It was warmed to 100° C. for 45 minutes, cooled, and the solvent removed under vacuum at room temperature. The residue, a yellow deliquescent powder, was washed with anhydrous ether. The product as obtained was analyzed for penicillin activity.

EXAMPLE V

Eight and two-tenths parts of acetoxy methylene phenaceturic azlactone and 5 parts of beta-mercapto-valine were allowed to react together for 45 minutes in a solution of 200 parts pyridine and 100 parts of water at room temperature. The mixture was poured into a cold aqueous solution, buffered with phosphates to a pH of 3, and extracted with cold chloroform. The chloroform was extracted by cold water containing sufficient sodium bicarbonate to maintain a pH of 6.2. The aqueous layer was quickly frozen, evaporated lyophylically. A yellow powdered residue was obtained that deliquesced on exposure to air.

EXAMPLE VI

Methoxymethylene phenaceturic azlactone (217 parts) was reacted at room temperature for 30 minutes with 214 parts of beta-mercapto-valine ethyl ester hydrochloride in 800 parts glacial acetic acid in the presence of 85 parts of sodium acetate. The acetic acid was removed by evaporation under reduced pressure at room temperature. The residue was extracted with anhydrous ether and the ether extract evaporated. The residue thus obtained as a yellow crystalline material was submitted for penicillin bioassay.

Obvious modifications will of course suggest themselves to the skilled chemist.

Compounds with various substituents as indicated react similarly. The therapeutic action varies depending upon the substituents and the organism upon which used.

We claim:

A method of preparing a therapeutically active product which comprises reacting approximately 8.2 parts of acetoxymethylene phenaceturic azlactone and 5 parts of beta-mercapto-valine in a solution of 200 parts of pyridine and 100 parts of water at room temperature for approximately 45 minutes; adding the reaction mixture to a cold phosphate-buffered, aqueous solution at a pH of approximately 3, and extracting the therapeutically active compound with cold chloroform; extracting the compound from the chloroform layer with an aqueous sodium bicarbonate solution at a pH of about 6.2; then removing the aqueous portion thereof by freezing and evaporating the water from the frozen state.

ELMER W. COOK.
SAMUEL KUSHNER.

REFERENCES CITED

The following references are of record in the file of this patent:

UNITED STATES PATENTS

| Number | Name | Date |
|---|---|---|
| 2,399,840 | Wachtel | May 7, 1946 |
| 2,461,949 | Wintersteiner et al. | Feb. 15, 1949 |
| 2,480,466 | Harris | Aug. 30, 1949 |

OTHER REFERENCES

British Reports XX, pp. 1–3, March 14, 1944.
University of Michigan Report CMR-B-5, July 1, 1944, pp. 2 and 3.
Cornell Reports D. 27, p. 1, March 1, 1945.
Science, December 21, 1945, vol. 102, pp. 627–629.
Science, November 8, 1946, vol. 104, pp. 431–433 and p. 450.
The Chemistry of Penicillin, Princeton Univ. Press 1949, pp. 162, 163, 196, 197, 638, 832 to 834, 784, 895, 940, 759, 892, 899 and 1019.
Merck Reports M. XIIa, pp. 10, 13.